US012313845B2

(12) United States Patent
Chatterjee et al.

(10) Patent No.: US 12,313,845 B2
(45) Date of Patent: May 27, 2025

(54) ILLUMINATING SPATIAL LIGHT MODULATOR WITH LED ARRAY

(71) Applicant: Microsoft Technology Licensing, LLC, Redmond, WA (US)

(72) Inventors: Ishan Chatterjee, Mountain View, CA (US); Fei Chen, Woodinville, WA (US); Bernard Charles Kress, Redwood City, CA (US); Maria Esther Pace, Palo Alto, CA (US); Joel Steven Kollin, Seattle, WA (US); Scott Jeffrey Woltman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 17/648,787

(22) Filed: Jan. 24, 2022

(65) Prior Publication Data

US 2023/0236417 A1    Jul. 27, 2023

(51) Int. Cl.
*G02B 27/01*    (2006.01)
*G02B 27/28*    (2006.01)
*G02B 27/42*    (2006.01)

(52) U.S. Cl.
CPC ....... *G02B 27/0101* (2013.01); *G02B 27/283* (2013.01); *G02B 27/4222* (2013.01)

(58) Field of Classification Search
CPC .............. G02B 27/0101; G02B 27/283; G02B 27/4222
USPC ......................................................... 359/618
See application file for complete search history.

(56) References Cited

U.S. PATENT DOCUMENTS

| 5,808,800 A | * | 9/1998 | Handschy | ............ | G02B 27/123 349/11 |
| 2004/0252281 A1 | | 12/2004 | Fischer et al. | | |
| 2005/0219847 A1 | * | 10/2005 | Ikeda | .................. | G02B 27/149 362/268 |

(Continued)

FOREIGN PATENT DOCUMENTS

| EP | 3579039 A1 | 12/2019 |
| WO | 2013049248 A3 | 7/2013 |

OTHER PUBLICATIONS

"International Search Report and Written Opinion Issued in PCT Application No. PCT/US22/048125", Mailed Date: Feb. 17, 2023, 11 Pages.

*Primary Examiner* — Jerry L Brooks
(74) *Attorney, Agent, or Firm* — Alleman Hall & Tuttle LLP (57) ABSTRACT

Examples are disclosed that relate to compact optical systems comprising SLMs. One example provides a projection system comprising an illumination stage including a light emitting diode (LED) array. The LED array comprises a plurality of red LEDs, a plurality of green LEDs, and a plurality of blue LEDs. The illumination stage further comprises an illumination stage optical system configured to control an angular extent of light emitted by the LED array and homogenize the light emitted by the LED array. The projection system further comprises an image forming stage configured to form an image from light output by the illumination stage, the image forming stage comprising a spatial light modulator (SLM) configured to spatially modulate the light output by the illumination stage to form an image, and one or more projection optics configured to project the image formed by the spatial light modulator.

18 Claims, 8 Drawing Sheets

(56) References Cited

U.S. PATENT DOCUMENTS

| | | | |
|---|---|---|---|
| 2011/0075105 A1* | 3/2011 | Ouyang | G03B 33/12 |
| | | | 362/555 |
| 2012/0170002 A1* | 7/2012 | Ouderkirk | G03B 21/2033 |
| | | | 353/30 |
| 2013/0077283 A1* | 3/2013 | Li | H04N 9/3167 |
| | | | 362/19 |
| 2014/0049734 A1 | 2/2014 | Erinjippurath et al. | |
| 2018/0120563 A1 | 5/2018 | Kollin et al. | |

* cited by examiner

ILLUMINATING SPATIAL LIGHT MODULATOR WITH LED ARRAY

BACKGROUND

A projection system may generate images using a spatial light modulator (SLM). Example SLMs include liquid crystal on silicon (LCOS) displays, transmissive liquid crystal displays (LCD), and digital micromirror (DMD) displays.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to using light emitting diode (LED) arrays to illuminate SLMs in compact optical systems. One example provides a projection system comprising an illumination stage including a LED array. The LED array comprises a plurality of red LEDs, a plurality of green LEDs, and a plurality of blue LEDs. The illumination stage further comprises an illumination stage optical system configured to control an angular extent of light emitted by the LED array and homogenize the light emitted by the LED array. The projection system further comprises an image forming stage comprising a spatial light modulator (SLM) configured to spatially modulate the light output by the illumination stage to form an image, and one or more projection optics configured to project the image formed by the spatial light modulator.

DETAILED DESCRIPTION

Figure 1:
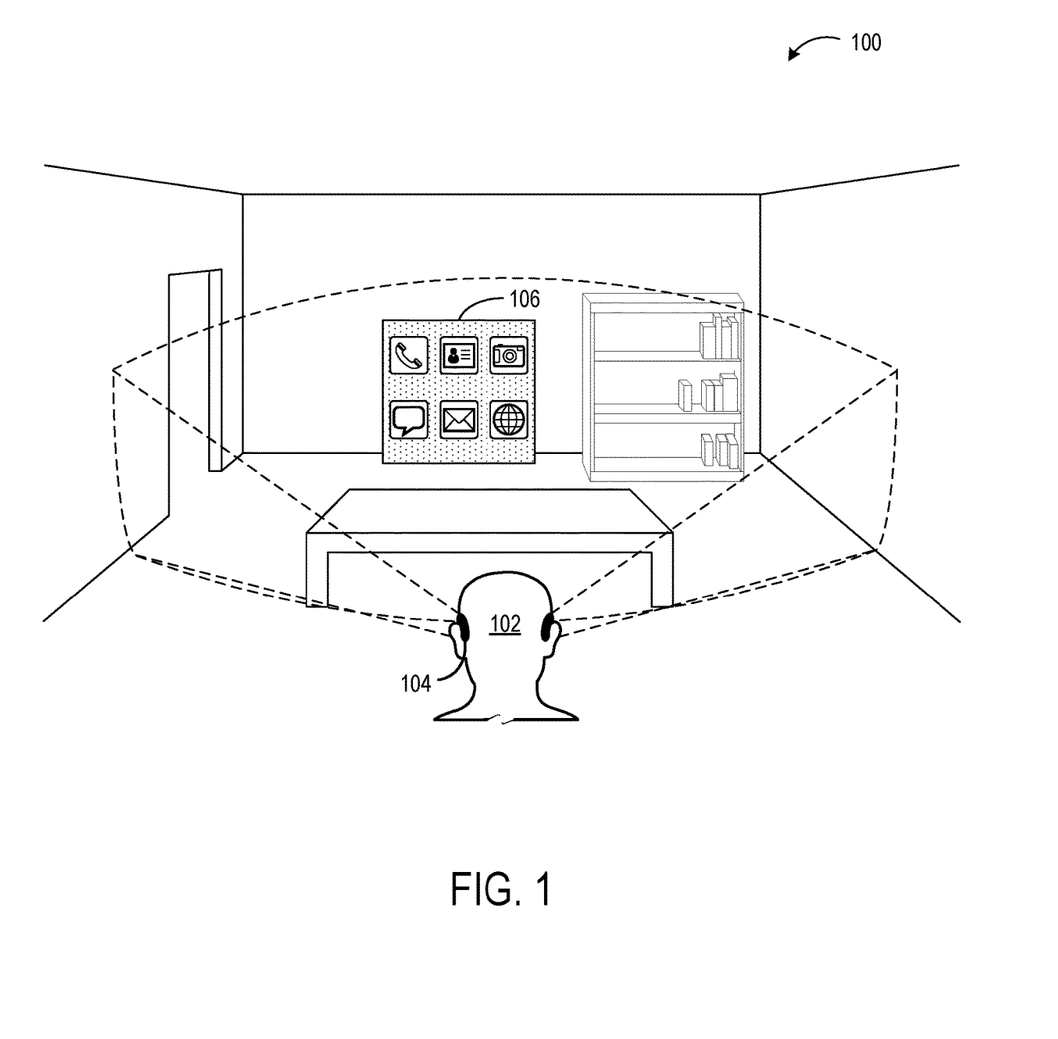
FIG. 1 shows an example use scenario for an augmented reality display system.

As mentioned above, a projection system may utilize an SLM to form images for display. FIG. 1 shows an example use scenario 100 in which a user 102 wearing a projection system in the form of an augmented reality head-mounted display 104 views a virtual image 106 displayed by the head-mounted display 104.

A projection system may use spatially separated light sources for red, green and blue illumination light for illuminating an SLM, where each spatially separated light sources comprises a single light source (e.g. an LED). Emitted rays from the light sources are shaped and combined via illumination system optics to achieve the appropriate beam shaping and homogenization for SLM illumination.

Figure 2A:
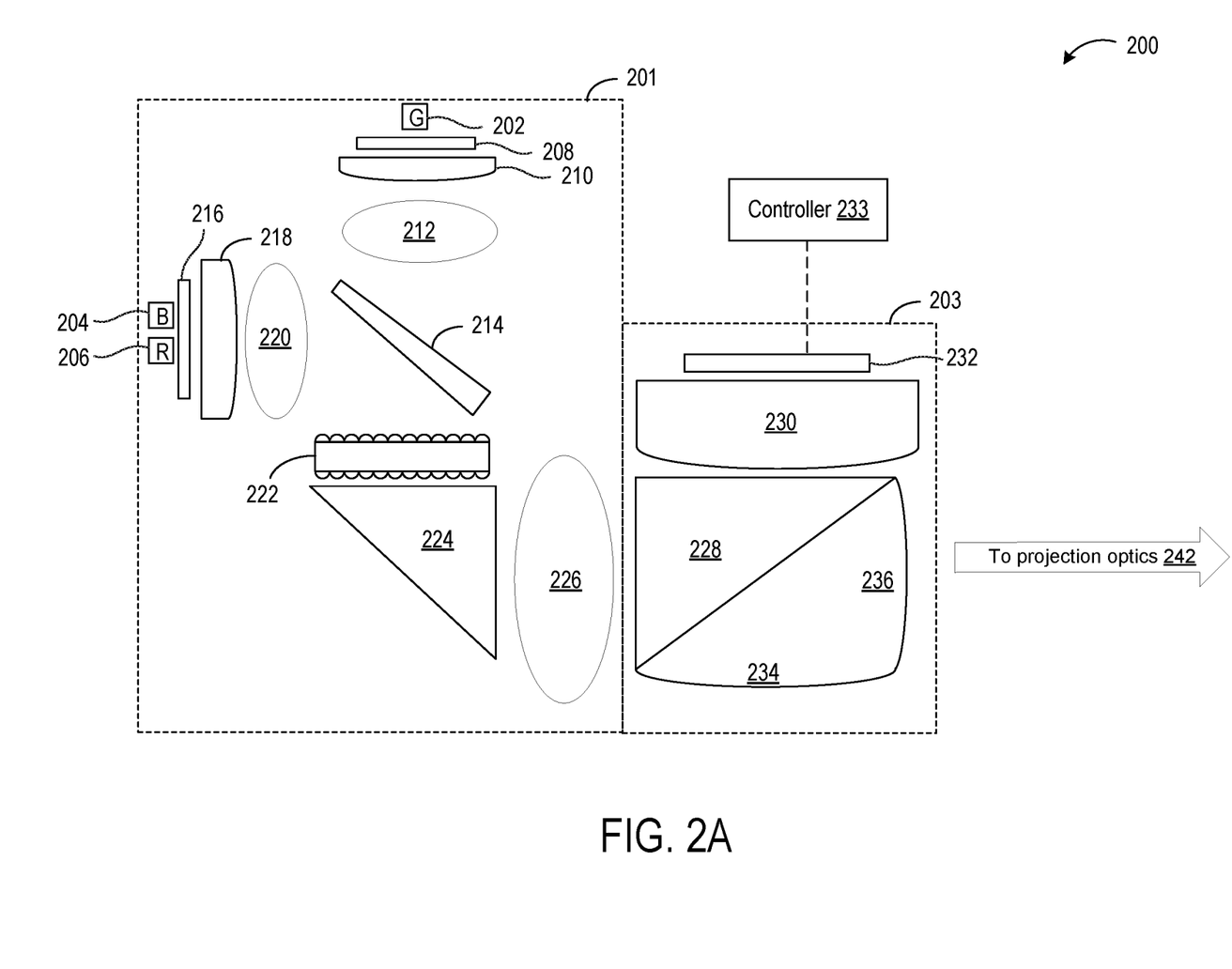
FIG. 2A shows a schematic view of an example projection system comprising spatially separated red, green and blue light sources.
Figure 2B:
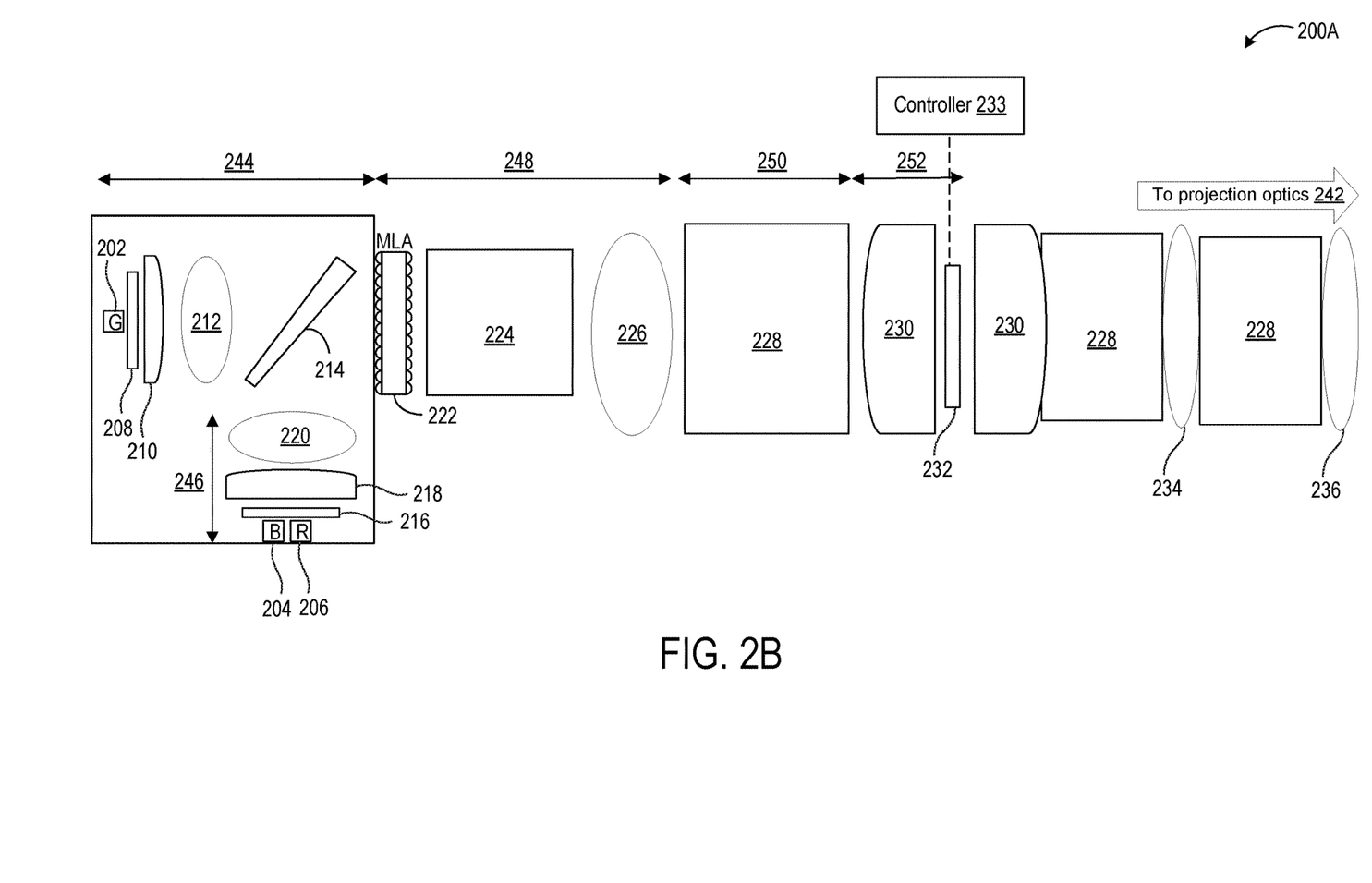
FIG. 2B shows an unfolded representation of the projection system of FIG. 2A.

However, the volume of space occupied by the light sources and corresponding optics may complicate the use of such a projection system in a compact form factor. FIG. 2A shows a block diagram of an example projection system 200 that utilizes such spatially separated light sources. FIG. 2B shows an unfolded representation 200A of the projection system 200.

More particularly, projection system 200 includes an illumination stage 201 and an image forming stage 203. Illumination stage 201 comprises a green light source (e.g. a green LED) 202, a blue light source (e.g. a blue LED) 204, and a red light source (e.g. a red LED) 206. Green light from the green light source 202 passes through optics 208, 210, 212 (e.g. one or more lenses and/or other suitable components) to a beam combiner 214. Similarly, light from blue light source 204 and red light source 206 passes through optics 216, 218, 220 to beam combiner 214. Beam combiner 214 combines the red, green and blue light into a single beam, and directs the beam to a microlens array (MLA) 222. Microlens array 222 homogenizes the light beam, and also helps shape the light beam. Microlens array 222 outputs the light to a prism 224 that directs the light to a lens 226. Lens 226 then directs the light to image forming stage 203.

A polarizing beam splitter (PBS) 228 of the image forming stage 203 directs the light through lens 230 and toward an SLM 232, which is controlled by a controller 233 to form an image. Image light from SLM 232 passes back through lens 230 and polarizing beam splitter 228, reflects from reflector 234 (incorporated in polarizing beam splitter 228), and then passes through lens 236 (also incorporated in polarizing beam splitter 228) toward other projection optics 242 (e.g. a waveguide and/or lens(es)) for display.

As mentioned above, projection system 200 may be difficult to fit into some form factors, such as an eyeglass form factor. As example dimensions, referring to FIG. 2B, dimension 244, encompassing the green light source, light source lenses, and beam combiner 214, may be approximately 7 mm. Dimension 246, encompassing the blue/red light source and corresponding light source lenses, may be approximately 3 mm. Dimension 248, which includes the microlens array 222, prism 224, and lens 226, may be approximately 9 mm. Dimension 250 of polarizing beam splitter 228 may be approximately 5 mm. Dimension 252, which includes lens 230 and SLM 232, may be approximately 3 mm. It will be understood that these dimensions are presented as examples, and may have different values in other examples.

The folding of the optical path of projection system 200 may help to reduce a size of the projection system along at least one dimension compared to an unfolded version of the same system. However, achieving further size reductions may pose challenges. For example, reducing the size of illumination stage 201 may lead to difficulties in properly shaping and homogenizing light over a shorter path length.

Accordingly, examples are disclosed that relate to utilizing a one-dimensional or two-dimensional array of red, blue and green LEDs as a light source for illuminating an SLM, rather than individual, spatially separated LED sources for each color. An LED array can be sized to allow for the source emission rays to be more widely distributed spatially, allowing reduction of the optical path length used for shaping and homogenizing the light compared to the use of individual, spatially separated LEDs for each color. This also may allow for the use of fewer and/or more compact illumination system optics to control an angular extent of the light and/or homogenize the light.

Figure 3:
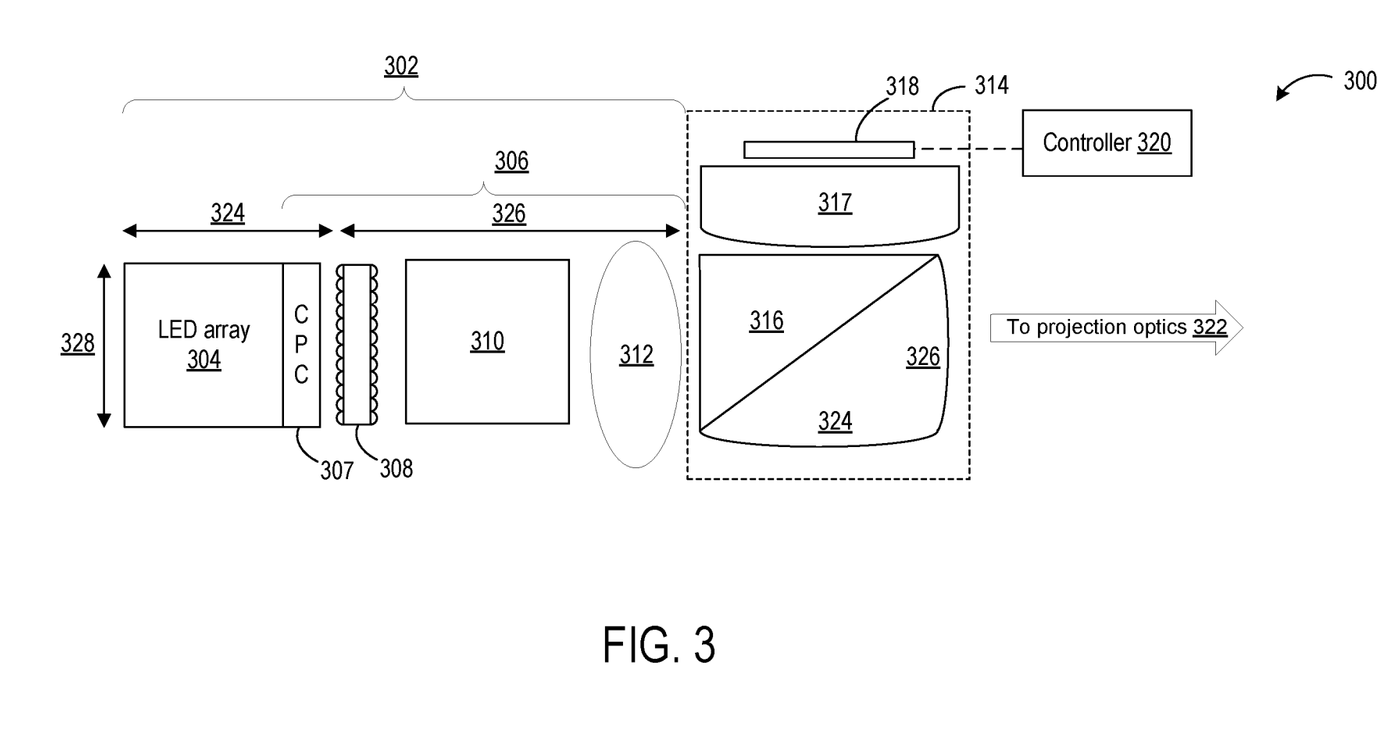
FIG. 3 shows an example projection system utilizing an LED array and compound parabolic concentrator to illuminate an SLM.

FIG. 3 shows an example projection system 300 that utilizes an LED array 302 as an SLM illumination light source. Projection system 300 may be used to project images in augmented reality head-mounted display device 100, for example. Projection system 300 comprises an illumination stage 302 including an LED array 304 and an illumination state optical system 306. LED array 304 comprises a plurality of red LEDs, green LEDs and blue LEDs in any suitable spatial arrangement. As one example, LED array 304 may comprise a 2×3 grid of LEDs, with two each of red LEDs, green LEDs and blue LEDs arranged in any suitable relative locations. In other examples, the LED array 304 may comprise a larger grid, for example, a 6×6 grid having twelve each of red, green and blue LEDs. In some examples, the LEDs may comprise micro-LEDs with an emitter size on the order of hundreds of microns. The individual micro-LEDs may have any suitable emitter shape, such as a rectangular shape. The LEDs of the array may be packaged in a same package, and the total size of the package may range from 2×2 millimeters to 5×5 millimeters in some examples. In other examples, a LED array for illuminating an SLM may have any other suitable configuration.

The light emitted by LED array 304 is shaped by a compound parabolic concentrator (CPC) 307 of illumination stage optical system 306. The use of LED array 304 provides a distribution of different colors of light over a wider area. This helps to avoid the use of a set of lenses to shape and collimate light from spatially separated single LEDs of each color, and also avoids the use of a beam combiner. In other examples, different color LED arrays may be used that are combined via a dichroic or beam combiner. For example, one LED array may include red and blue LEDs, and the other LED array may include green LEDs. A compound parabolic concentrator may be included for each color LED array. Compound parabolic concentrator 307 controls an angular extent of the light, and helps to eliminate the working distance of lenses and/or other optical components used to collimate the light, such as those in projection system 200. In other examples, a lens array or other suitable collimating optical element for reducing the angular extend of light may be used instead of a compound parabolic concentrator.

The light shaped by compound parabolic concentrator 307 is further shaped and steered by a microlens array 308, prism 310, and lens 312 of illumination stage optical system 306. It will be understood that microlens array 308, prism 310, and lens 312 may be optional. Light from illumination stage optical system 306 is directed to an image forming stage 314 comprising a polarizing beam splitter 316, lens 317 and SLM 318. A controller 320 controls SLM 318 to produce an image for display, as described above with reference to FIG. 2. Polarizing beam splitter 316 further includes reflector 325 and lens 326, which redirect light from SLM 318 toward projection optics 322. In other examples, a projection system utilizing an LED array and a compound parabolic concentrator may have any other suitable configuration.

The dimensions of illumination stage 302 may be smaller than those of illumination stage 201 of projection system 200, and thus may help to reduce the size of a projection device comprising projection system 300 compared to a device comprising projection system 200. For example, dimension 324, which represents optical components upstream of microlens array 308, may be approximately 5 mm, compared to 7 mm for corresponding dimension 244 of projection system 200. The arrangement of FIG. 3B thus may more easily fit into a slim form factor, such as eyeglass form factor.

Figure 4:
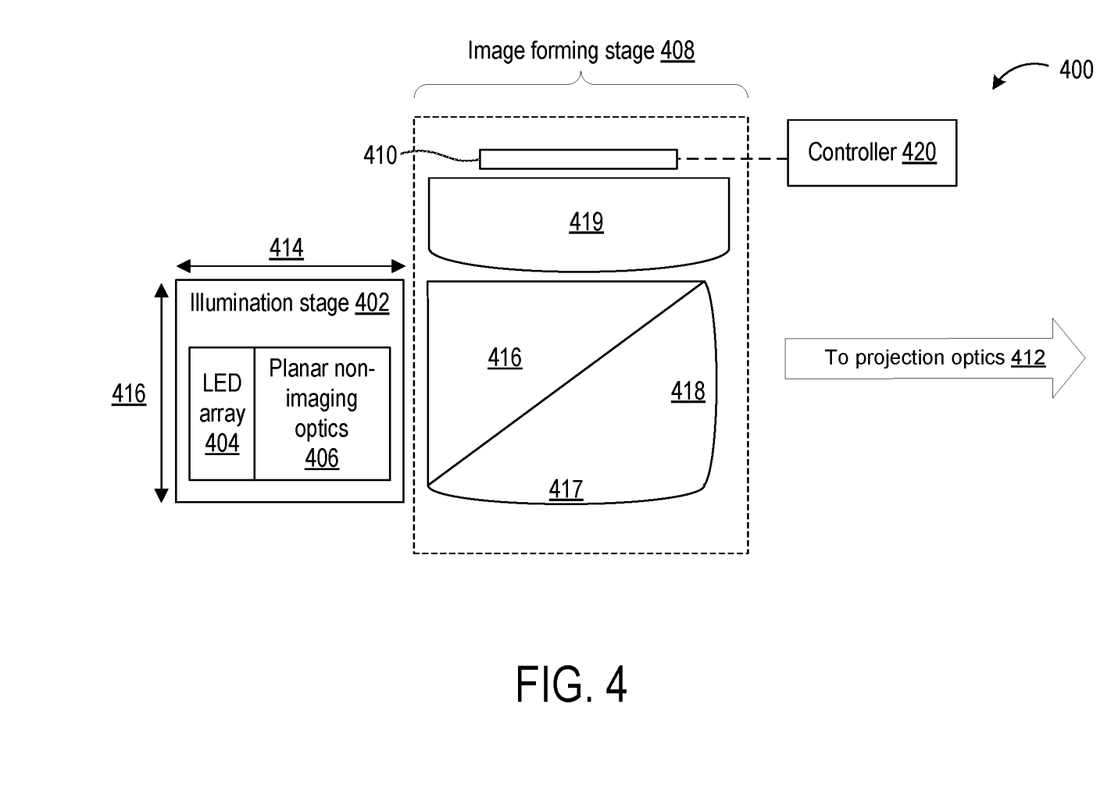
FIG. 4 shows an example projection system comprising an LED array and planar non-imaging optics to illuminate an SLM.

A further reduction in size may be achieved by eliminating the compound parabolic concentrator of projection system 300, and using planar non-imaging optics to help shape and homogenize illumination light from an LED array. FIG. 4 shows an example projection system 400 that includes an illumination stage 402 utilizing an RGB LED array 404 and planar non-imaging optics 406. Projection system 400 is another example of a projection system that can be used to project images in augmented reality head-mounted display device 100. In this example, the use of planar non-imaging optics 406 allows projection system 400 to omit a microlens array, which further reduces a volume of the projection system compared to projection systems 200 and 300. Projection system 400 further includes a polarizing beam splitter 416 (which includes reflector 417 and lens 418), lens 419, and a controller 420 to control SLM 410. In other examples, a projection system utilizing an LED array and planar non-imaging optics may have any other suitable configuration.

Any suitable non-imaging optics may be used as planar non-imaging optics 406. In some examples, planar non-imaging optics 406 may comprise a diffuser configured to control angular distribution of the light and homogenize the light from LED array 404. Such a diffuser thus performs the functions of the compound parabolic concentrator and the microlens array of projection system 300. In some examples, an engineered diffuser may be used, which can be configured to direct the diffused light towards a preferred orientation. An engineered diffuser may also allow control of the amount of diffusion, which can vary between different axes. In other examples, planar non-imaging optics 406 may additionally or alternatively include a brightness enhancing film. The brightness enhancing film may be incorporated with LED array 404 as a film positioned over the LEDs, for example. The brightness enhancing film utilizes refraction and reflection to increase the efficiency of light from LED array 404 by refracting light that exits at within a certain range of angles relative to the system optical axis toward image forming stage 408. Light outside of this range is recycled by the brightness enhancing film until it exits within the angular range allowed.

In yet other examples, the planar non-imaging optics 406 may additionally or alternatively include a dual brightness enhancing film. The dual brightness enhancing film may be incorporated with LED array 404 as a substrate, for example. A dual brightness enhancing film is a multi-layer, thin film reflective polarizer that may output light of one polarization while recycling light of another polarization, thereby outputting light of a preferential polarization. Because SLM 410 may be configured to receive and modulate polarized light (e.g. where SLM 410 comprises an LCOS or transmissive LCD), the dual brightness enhancing film may be configured to output polarized light primarily of the orientation received by the SLM 410, thereby increasing light efficiency. In these examples, the spatial distribution of the light may be provided by the LED array, while the angular distribution of the light may be provided by the diffuser, brightness enhancing film, and/or dual brightness enhancing film. It will be understood that other suitable planar non-imaging optics may be utilized in other examples.

As mentioned above, the use of planar non-imaging optics 406 may allow a compound parabolic concentrator and microlens array to be omitted, and thereby may provide projection system 400 with a more compact size compared to projection system 300 and projection system 200. As example dimensions, length 414 of the illumination stage 402 of projection system 400, which represents optical components upstream of polarizing beam splitter 416, may be 6 mm. In comparison, a total length of illumination stage 302 is 14 mm in some examples (5 mm for dimension 324 plus 9 mm for dimension 326).

Figure 5:
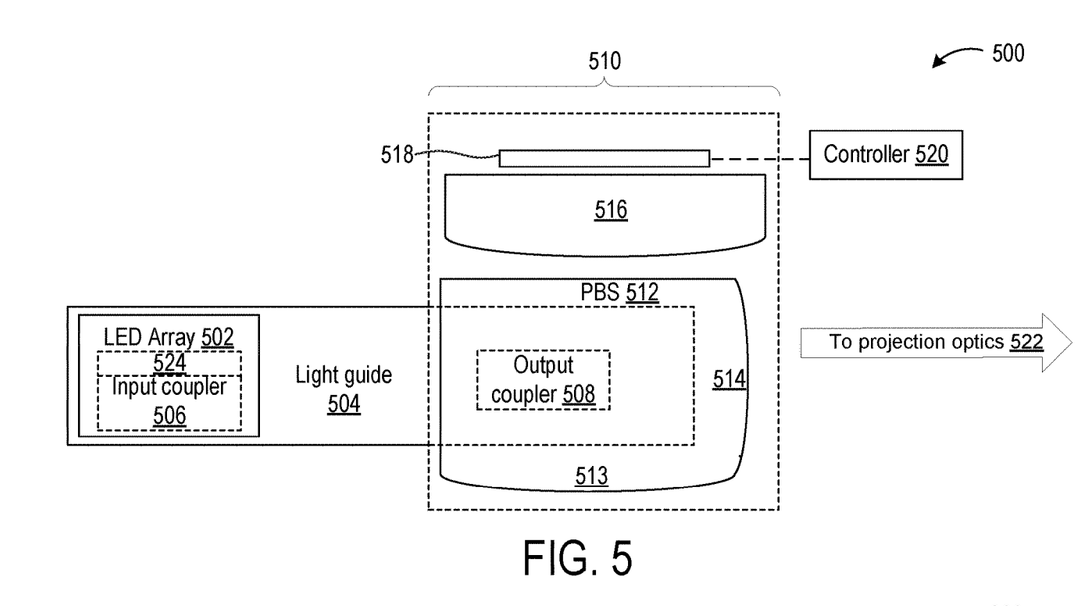
FIG. 5 shows an example projection system comprising an LED array and a light guide to illuminate an SLM.

In further examples, a projection system may comprise an illumination stage optical system that utilizes a light guide to shape and homogenize light from an LED array for SLM illumination. A light guide may be relatively thin and flat, and thus fit into small device form factors. FIG. 5 shows an example projection system 500 including a LED array 502 and a light guide 504. Projection system 500 is a further example of a projection system suitable for use in augmented reality head mounted display device 100.

Light guide 504 provides a folded optical path via total internal reflection, and thus performs homogenization and shaping over an optical path longer than a dimensional length of the light guide. Light guide 504 may have any suitable configuration. As one example, light guide 504 may take the form of a rectangular prism, and have a length within a range of 15 mm to 70 mm. In such an example, the light guide may have a width within a range of 5 mm to 15 mm, and a thickness in a range of 0.3 mm to 6.0 mm. In other examples, the light guide 504 may have any other suitable shape and/or dimensions.

Light guide 504 includes an input coupler 506 configured couple light received from LED array 502 into light guide 504, and an output coupler 508 configured to outcouple light from light guide 504 toward optics of an image-producing stage 510. In this example, output coupler 508 outcouples light toward a polarizing beam splitter 512 of the image forming stage 510. Similar to other examples described above, polarizing beam splitter 512 comprises a reflector 513 and lens 514. Light from polarizing beam splitter 512 passes through lens 516 to illuminate SLM 518, which is controlled by a controller 516. The resulting image is projected as described above for other examples. In other examples, a projection system comprising a light guide may be incorporated into any other suitable optical system. Although not shown in FIG. 5, in some examples, a compound parabolic concentrator or lens array may optionally be included after the LED array 502 and before the light guide 504.

Input coupler 506 and output coupler 508 each may include any suitable structures for respectively coupling light into and out of light guide 504. Examples include refractive or reflective structures such as mirrors and prisms, and diffractive structures such as gratings. Examples of suitable refractive structures include one or more prisms adhered to or formed in a waveguide surface. Examples of suitable gratings include surface relief gratings, volume gratings, holographic gratings, and polarization gratings. Polarization gratings may offer the advantage of a relatively wide angular bandwidth. As polarization gratings may be selective based upon a direction of circular polarization, a quarter wave plate (illustrated at 524) may be positioned between LED array 502 and light guide 504. Further, where a reflective polarization element is used, a polarization recycling scheme also may be used to help improve an efficiency of the projection system, as light that is not the correct polarization to be incoupled is rotated by the quarter wave plate and reflected back toward the LED array, e.g. by a wire grid polarizer. The light then reflected back again towards the waveguide will be rotated a second time by the quarter wave plate to a correct polarization for incoupling.

Figure 8:
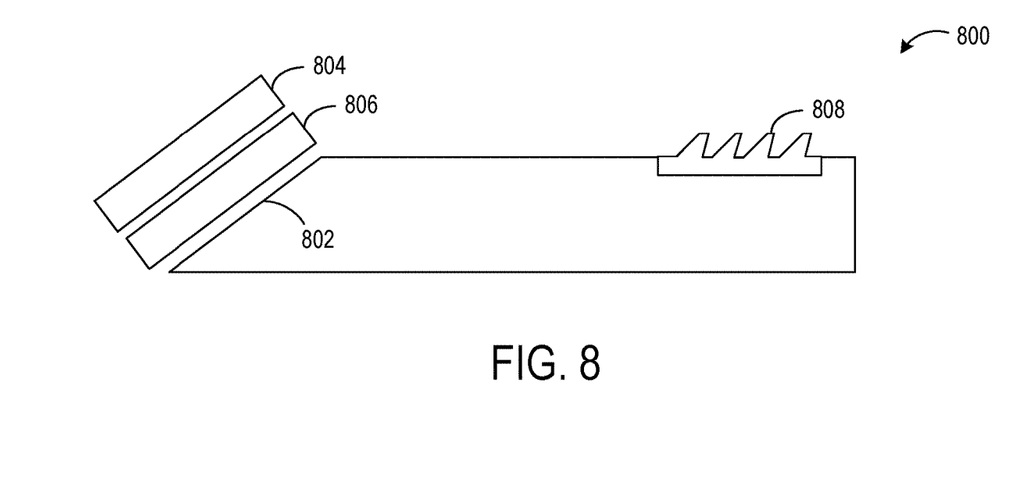
FIG. 8 shows an example waveguide comprising an angled side for incoupling light from an LED array.

In the example of FIG. 5, light from the LED array is incoupled at a flat plane of a rectangular-shaped light guide. In other examples, a light guide may comprise a beveled corner or angled edge at which the LED array is mounted. In such examples, light can be incoupled into the light guide without the use of a grating or prism. A CPC or planar non-imaging optic may be included to collimate and shape the light for efficient incoupling. FIG. 8 shows an example waveguide 800 comprising an angled edge 802 for incoupling light from an LED array 804. Optional collimation element 806 may comprise a CPC, lens array, lens, or any other suitable optical element(s). While depicted as including an outcoupling grating 808, any other suitable outcoupling element may be used, such as one or more prisms and/or reflectors. Further, while the waveguides of FIGS. 5 and 8 are described above in the context of a light guide that is rectangular, in other examples a light guide may comprise a wedge shape, or any other suitable shape. Where a wedge-shaped light guide is used, light may emerge from the light guide very close to a critical angle of internal reflection. As such, a suitable structure for redirecting the light toward a user may be included (e.g. a lens array, or reflective and/or refractive array).

A light guide may have any suitable orientation relative to an image-forming stage other than that shown in FIG. 5. This flexibility may allow a projection system comprising a light guide and LED array for illuminating an SLM to be fit into devices of various configurations.

Figure 6:
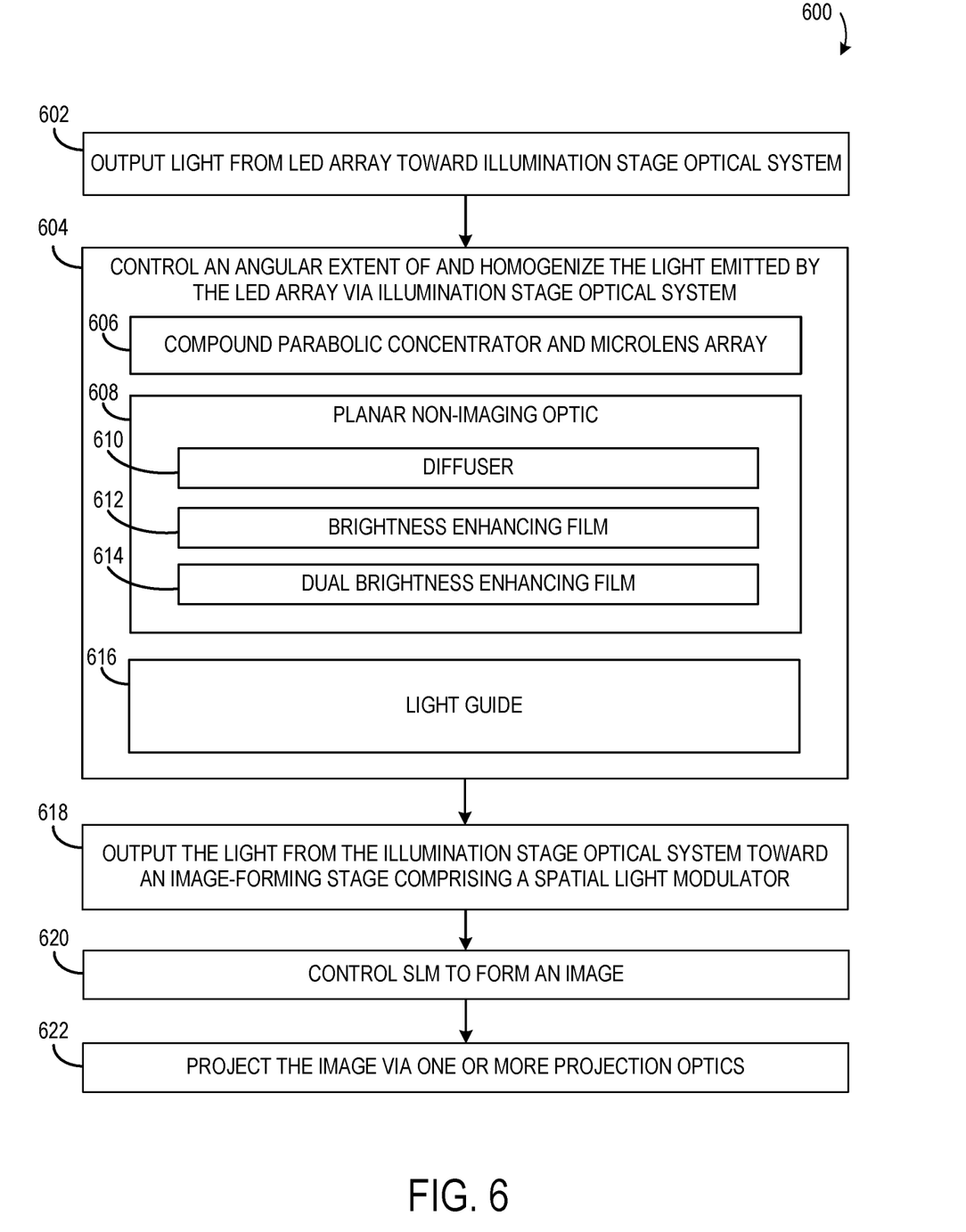
FIG. 6 shows a flow diagram depicting an example method of projecting an image.

FIG. 6 shows an example method 600 of projecting an image via a projection system, such as the projection systems of FIG. 3B, FIG. 4 and FIG. 5. Method 600 includes, at 602, outputting light from an LED array of the illumination stage toward an illumination stage optical system of the illumination stage. The LED array may include a plurality each of red LEDs, green LEDs, and blue LEDs. Method 600 further includes, at 604, controlling an angular extent of and homogenizing the light emitted by the LED array at the illumination stage optical system. For example, process 604 may include controlling a spatial distribution and color distribution of the light to distribute the light more uniformly and mix the colors.

In some examples, the illumination stage optical system may include a compound parabolic concentrator and microlens array, at 606, as described above with reference to FIG. 3. In other examples, the illumination stage optical system may include a planar non-imaging optic, at 608. Examples of planar non-imaging optics include a diffuser 610, a brightness enhancing film 612, and/or a dual brightness enhancing film 614. The use of a suitably designed diffuser may allow omission of a compound parabolic concentrator and microlens array, potentially reducing a spatial volume of a projection system. A brightness enhancing film and/or dual brightness enhancing film alternatively or additionally may be incorporated with the LED array to homogenize and shape light from the LED array. A dual brightness enhancing film may be used to output light of a preferential polarization, thereby increasing light efficiency compared to systems that omit a dual brightness enhancing film.

In yet other examples, the illumination stage optical system may include a light guide to shape and homogenize the light, instead of or in addition to a compound parabolic concentrator and/or planar non-imaging optics. In various examples, the light guide may comprise a rectangular prism shape, or a wedge shape, and may utilize any suitable input coupling and output coupling structures.

Method 600 further includes, at 618, outputting the light from the illumination stage optical system to an image-forming stage comprising an SLM. In various examples, the image-forming stage may comprise an LCOS panel, an LCD, or a DMD. The image-forming stage further may include other components, such as a polarizing beam splitter to polarize light for a LCOS or LCD panel and to fold an optical path, thereby reducing system volume. Continuing, method 600 includes, at 620, controlling the SLM to form an image, and at 622, projecting the image via one or more projection optics. The one or more projection optics may include a waveguide, for example.

While disclosed herein in the context of an augmented reality display system, the disclosed examples may be utilized in any suitable projection system. Other examples of suitable projection systems include virtual reality display systems and picoprojectors.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
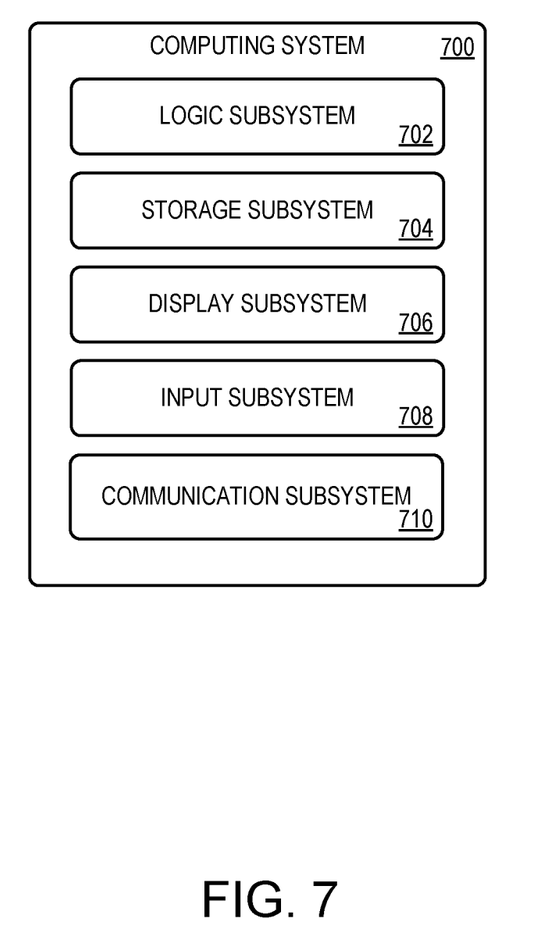
FIG. 7 is a block diagram of an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices. Augmented reality display device 104, controller 244, controller 322, and controller 418 are examples of computing system 700.

Computing system 700 includes a logic subsystem 702 and a storage subsystem 704. Computing system 700 may optionally include a display subsystem 706, input subsystem 708, communication subsystem 710, and/or other components not shown in FIG. 7.

Logic subsystem 702 includes one or more physical devices configured to execute instructions. For example, the logic subsystem 702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 702 may include one or more processors configured to execute software instructions. Additionally or alternatively, the logic subsystem 702 may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic subsystem 702 optionally may be distributed among two or more separate devices, which may be remotely located and/or configured for coordinated processing. Aspects of the logic subsystem 702 may be virtualized and executed by remotely accessible, networked computing devices configured in a cloud-computing configuration.

Storage subsystem 704 includes one or more physical devices configured to hold instructions executable by the logic subsystem 702 to implement the methods and processes described herein. When such methods and processes are implemented, the state of storage subsystem 704 may be transformed—e.g., to hold different data.

Storage subsystem 704 may include removable and/or built-in devices. Storage subsystem 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 704 may include volatile, nonvolatile, dynamic, static, read/write, read-only, random-access, sequential-access, location-addressable, file-addressable, and/or content-addressable devices.

It will be appreciated that storage subsystem 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and storage subsystem 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by storage subsystem 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic subsystem 702 and/or storage subsystem 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides a projection system comprising an illumination stage comprising a light emitting diode (LED) array comprising a plurality of red LEDs, a plurality of green LEDs, and a plurality of blue LEDs, and an illumination stage optical system configured to control an angular extent of light emitted by the LED array and homogenize the light emitted by the LED array, an image forming stage configured to form an image from light output by the illumination stage, the image forming stage comprising a spatial light modulator (SLM) configured to spatially modulate the light output by the illumination stage to form an image, and one or more projection optics configured to project the image formed by the spatial light modulator. The illumination stage optical system may additionally or alternatively include one or more of a compound parabolic concentrator, a lens array, a microlens array, or a lens. The illumination stage optical system may additionally or alternatively include a planar non-imaging optic. The planar non-imaging optic may additionally or alternatively include a diffuser. The planar non-imaging optic may additionally or alternatively include a brightness enhancing film. The planar non-imaging optic may additionally or alternatively include a dual brightness enhancing film. The planar non-imaging optic may additionally or alternatively be configured to output light to a polarizing beam splitter. The SLM may additionally or alternatively include a liquid crystal on silicon (LCOS) display. The illumination stage optical system may additionally or alternatively include a light guide, the light guide comprising an input coupler configured to receive light from the LED array, and an output coupler configured to output light to the image forming stage. The input coupler may additionally or alternatively include a polarizing grating. The projection system may additionally or alternatively be incorporated into an augmented reality head-mounted display device.

Another example provides a projection system, comprising an illumination stage comprising a light emitting diode (LED) array comprising a plurality of red LEDs, a plurality of green LEDs, and a plurality of blue LEDs, and an illumination stage optical system configured to control an angular extent of the light emitted by the LED array and homogenize the light emitted by the LED array, a polarizing spatial light modulator configured to receive light from the illumination stage optical system, polarize the light and form an image, and one or more projection optics configured to project the image formed by the spatial light modulator. The illumination stage optical system may additionally or alternatively include one or more of a compound parabolic concentrator, a lens array, a microlens array, or a lens. The illumination stage optical system may additionally or alternatively include a planar non-imaging optic. The planar non-imaging optic may additionally or alternatively include a diffuser. The planar non-imaging optic may additionally or alternatively include a brightness enhancing film. The planar non-imaging optic may additionally or alternatively include a dual brightness enhancing film. The planar non-imaging optic may additionally or alternatively be coupled to a beam splitter of the image forming stage. The polarizing spatial light modulator may additionally or alternatively include a liquid crystal on silicon (LCOS) panel.

Another example provides enacted on a projection system comprising a light emitting diode (LED) array comprising a plurality of red LEDs, a plurality of green LEDs, and a plurality of blue LEDs, an illumination stage optical system, an image forming stage comprising a spatial light modulator (SLM), and one or more projection optics, a method, comprising outputting light from the LED array toward the illumination stage optical system, controlling an angular extent of and homogenize the light emitted by the LED array via the illumination stage optical system, outputting the light from the illumination stage optical system to the image forming stage, controlling the SLM to form an image, and projecting the image via one or more projection optics.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A projection system, comprising
an illumination stage comprising
a light emitting diode (LED) array comprising a plurality of red LEDs, a plurality of green LEDs, and a plurality of blue LEDs, and
an illumination stage optical system configured to control an angular extent of light emitted by the LED array using a compound parabolic concentrator and to homogenize the light emitted by the LED array, wherein the illumination stage is configured to output homogenized light without the use of a beam combiner to combine light of different colors into a single beam;
an image forming stage configured to form an image from the homogenized light output by the illumination stage, the image forming stage comprising a polarizing beam splitter and a spatial light modulator (SLM), wherein the polarizing beam splitter comprises an integral reflector that is positioned on a first side of the polarizing beam splitter that opposes the SLM and an integral lens on a second side of the polarizing beam splitter that opposes the illumination stage, wherein the polarizing beam splitter is configured to direct the homogenized light to the SLM, wherein the SLM is configured to spatially modulate the homogenized light to generate image light that is output to the polarizing beam splitter, wherein the image light reflects off the integral reflector within the polarizing beam splitter and is directed to pass through the integral lens to be output from the illumination stage; and
one or more projection optics configured to receive the image light that passes through the integral lens of the polarizing beam splitter and project the image light to display an image.

2. The projection system of claim 1, wherein the illumination stage optical system comprises one or more of a lens array, a microlens array, or a lens.

3. The projection system of claim 1, wherein the illumination stage optical system comprises a planar non-imaging optic.

4. The projection system of claim 3, wherein the planar non-imaging optic comprises a diffuser.

5. The projection system of claim 3, wherein the planar non-imaging optic comprises a brightness enhancing film.

6. The projection system of claim 3, wherein the planar non-imaging optic comprises a dual brightness enhancing film.

7. The projection system of claim 3, wherein the planar non-imaging optic is configured to output light to the polarizing beam splitter.

8. The projection system of claim 1, wherein the SLM comprises a liquid crystal on silicon (LCOS) display.

9. The projection system of claim 1, wherein the projection system is incorporated into an augmented reality head-mounted display device.

10. A projection system, comprising
an illumination stage comprising
a light emitting diode (LED) array comprising a plurality of red LEDs, a plurality of green LEDs, and a plurality of blue LEDs, and
an illumination stage optical system configured to control an angular extent of the light emitted by the LED array using a compound parabolic concentrator and to homogenize the light emitted by the LED array, wherein the illumination stage is configured to output homogenized light without the use of a beam combiner to combine light of different colors into a single beam;
a polarizing spatial light modulator;
a polarizing beam splitter comprising an integral reflector that is positioned on a first side of the polarizing beam splitter that opposes the polarizing spatial light modulator and an integral lens on a second side of the polarizing beam splitter that opposes the illumination stage,
wherein the polarizing beam splitter is configured to direct the homogenized light to the polarizing spatial light modulator,
wherein the polarizing spatial light modulator is configured to spatially modulate the homogenized light to generate image light that is output to the polarizing beam splitter,
wherein the image light reflects off the integral reflector within the polarizing beam splitter and is directed to pass through the integral lens to be output from polarizing beam splitter; and
one or more projection optics configured to receive the image light that passes through the integral lens of the polarizing beam splitter and project the image light to display an image.

11. The projection system of claim 10, wherein the illumination stage optical system comprises one or more of a lens array, a microlens array, or a lens.

12. The projection system of claim 10, wherein the illumination stage optical system comprises a planar non-imaging optic.

13. The projection system of claim 12, wherein the planar non-imaging optic comprises a diffuser.

14. The projection system of claim 12, wherein the planar non-imaging optic comprises a brightness enhancing film.

15. The projection system of claim 12, wherein the planar non-imaging optic comprises a dual brightness enhancing film.

16. The projection system of claim 12, wherein the planar non-imaging optic is coupled to a beam splitter of the image forming stage.

17. The projection system of claim 10, wherein the polarizing spatial light modulator comprises a liquid crystal on silicon (LCOS) panel.

18. Enacted on a projection system comprising a light emitting diode (LED) array comprising a plurality of red LEDs, a plurality of green LEDs, and a plurality of blue LEDs, an illumination stage optical system, an image forming stage comprising a spatial light modulator (SLM) and a polarizing beam splitter comprising an integral reflector that is positioned on a first side of the polarizing beam splitter that opposes the SLM and an integral lens on a second side of the polarizing beam splitter that opposes the illumination stage, and one or more projection optics, a method, comprising:
outputting light from the LED array toward the illumination stage optical system;
controlling an angular extent of the light emitted by the LED array using a compound parabolic concentrator and homogenizing the light emitted by the LED array via the illumination stage optical system, wherein the illumination stage is configured to output homogenized light without the use of a beam combiner to combine light of different colors into a single beam;
outputting the homogenized light from the illumination stage optical system to the image forming stage;
directing the homogenized light received from the illumination stage optical system to the SLM via the polarizing beam splitter;
controlling the SLM to spatially modulate the homogenized light to generate image light that is output to the polarizing beam splitter;
reflecting the image light off the integral reflector within the polarizing beam splitter and directing the reflected image light to pass through the integral lens to be output from polarizing beam splitter to the one or more projection optics; and
projecting the image light via one or more projection optics to display an image.

* * * * *